US011288394B2

(12) United States Patent
Lin (10) Patent No.: US 11,288,394 B2
(45) Date of Patent: Mar. 29, 2022

(54) WEBPAGE CONTENT SELF-PROTECTION METHOD AND ASSOCIATED SERVER

(71) Applicant: ACER INCORPORATED, New Taipei (TW)

(72) Inventor: Geng-Bao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 448 days.

(21) Appl. No.: 16/386,231

(22) Filed: Apr. 16, 2019

(65) Prior Publication Data
US 2020/0089904 A1    Mar. 19, 2020

(30) Foreign Application Priority Data

Sep. 19, 2018  (TW) .................................. 107132913

(51) Int. Cl.
| | | |
|---|---|---|
| *G06F 16/958* | (2019.01) | |
| *H04L 29/06* | (2006.01) | |
| *G06F 21/62* | (2013.01) | |
| *G06F 40/14* | (2020.01) | |

(52) U.S. Cl.
CPC ........ *G06F 21/6227* (2013.01); *G06F 16/972* (2019.01); *G06F 40/14* (2020.01); *H04L 63/0838* (2013.01)

(58) Field of Classification Search
CPC .... G06F 16/972; G06F 21/6227; G06F 40/14; H04L 63/0838
See application file for complete search history.

(56) References Cited

U.S. PATENT DOCUMENTS

| | | | | |
|---|---|---|---|---|
| 6,275,938 B1* | 8/2001 | Bond | ...................... | G06F 21/53 714/38.13 |
| 6,735,694 B1* | 5/2004 | Berstis | ................ | H04L 63/0823 713/176 |
| 8,789,199 B2* | 7/2014 | Boesgaard | .............. | G06F 21/14 726/26 |
| 9,860,270 B2* | 1/2018 | Kuskov | ................. | G06F 21/566 |

(Continued)

FOREIGN PATENT DOCUMENTS

TW    I669624 B    8/2019

*Primary Examiner* — Scott T Baderman
*Assistant Examiner* — Mario M Velez-Lopez
(74) *Attorney, Agent, or Firm* — Winston Hsu (57) ABSTRACT

A webpage content self-protection method includes: running a set of webpage elements of at least one webpage through a browser, wherein at least one portion of webpage elements within the set of webpage elements includes webpage contents of the aforementioned at least one webpage; monitoring a target webpage element within the set of webpage elements to determine whether any content variation event associated to the target webpage element occurs; when the content variation event occurs, storing previous data of the target webpage element, and generating a first password, wherein the first password is a one-time password; trying extracting a second password from the target webpage element, in order to perform password verification; and when failure of extracting the second password occurs or the first password and the second password are different from each other, recovering the target webpage element according to the previous data. An associated server is also provided.

20 Claims, 4 Drawing Sheets

(56) References Cited

U.S. PATENT DOCUMENTS

2002/0108060 A1* 8/2002 Takamoto ............. H04L 63/083
                                                        726/4
2010/0318807 A1* 12/2010 Wang ..................... G06F 21/83
                                                       713/184
2015/0269364 A1* 9/2015 Gupta ..................... H04L 67/42
                                                        726/4

* cited by examiner

WEBPAGE CONTENT SELF-PROTECTION METHOD AND ASSOCIATED SERVER

BACKGROUND OF THE INVENTION

1. Field of the Invention

The present invention relates to webpage protection, and more particularly, to a method and associated server for webpage content self-protection.

2. Description of the Prior Art

Webpage content providers generally hope users to see correct and unmodified webpage contents. However, the environment of a client device may variation in various ways. For example, when a client device is infected with virus and is installed with browser plugins, the webpage contents seen by the user can be totally different from the original webpage contents. Some minor variations merely affect the variation of background colors, while some severe variations involve the insertion of contents that contain illegal, violence and sex materials. As a result, not only the purposes of the webpage contents providers will be misunderstood, the personal rights of users might also be invaded. Hence, there is a need for a novel method and associated architecture for improving the webpage protection.

SUMMARY OF THE INVENTION

An objective of the present invention is to provide a webpage content self-protection method and associated server to solve the aforementioned problem.

Another objective of the present invention is to provide a webpage content self-protection method and associated server, in order to perform webpage content self-protection on the electronic device without the aid of the webpage server.

At least one embodiment of the present invention provides a webpage content self-protection method, where the webpage content self-protection method may comprise: running a set of webpage elements of at least one webpage through a browser, wherein at least one portion of webpage elements within the set of webpage elements comprises webpage contents of the aforementioned at least one webpage; and running a program module of the aforementioned at least one web page through the browser to perform the following steps: monitoring a target webpage element within the set of webpage elements to determine whether any content variation event related to the target webpage element occurs; when the content variation event occurs, storing previous data of the target webpage element and generating a first password, wherein the first password is a one-time password (OTP); trying extracting a second password from the target webpage element, for performing password verification, wherein in a situation where the target webpage element has not been modified, the second password is expected to be equal to the first password; and when failure of extracting the second password occurs, or the first password and the second password are different from each other, recovering the target webpage element according to the previous data.

At least one embodiment of the present invention provides a server, where the server may comprise a network interface circuit and a processing circuit that is coupled to the network interface circuit. The network interface circuit may be arranged to couple the server to at least one network, and the processing circuit may be arranged to control operations of the server. The processing circuit may utilize the network interface circuit to transmit webpage program codes carrying webpage contents from the server to a browser in a client device through the aforementioned at least one network, for performing webpage content self-protection while displaying the webpage contents, wherein the webpage program codes comprise a set of webpage elements and a program module of at least one webpage. The aforementioned webpage content self-protection may comprise: running the set of webpage elements of said at least one webpage through the browser, wherein at least one portion of webpage elements within the set of webpage elements comprises the webpage contents of said at least one webpage; and running the program module of said at least one webpage through the browser to perform following steps: monitoring a target webpage element within the set of webpage elements to determine whether any content variation event related to the target webpage element occurs; when the content variation event occurs, storing previous data of the target webpage element and generating a first password, wherein the first password is a one-time password (OTP); trying extracting a second password from the target webpage element, for performing password verification, wherein in a situation where the target webpage element has not been modified, the second password is expected to be equal to the first password; and when failure of extracting the second password occurs, or the first password and the second password are different from each other, recovering the target webpage element according to the previous data.

At least one embodiment of the present invention provides a client device. The client device comprises a network interface circuit and a processing circuit. The network interface circuit is arranged to couple the client device to at least one network. The processing circuit is coupled to the network interface circuit, and arranged to control operations of the client device, wherein the processing circuit utilizes the network interface circuit to receive webpage program codes carrying webpage contents from the server through said at least one network, for performing webpage content self-protection while displaying the webpage contents, wherein the webpage program codes comprise a set of webpage elements and a program module of at least one webpage. The webpage content self-protection comprises: running the set of webpage elements of said at least one webpage through a browser, wherein at least one portion of webpage elements within the set of webpage elements comprises the webpage contents of said at least one webpage; and running the program module of said at least one webpage through the browser to perform following steps: monitoring a target webpage element within the set of webpage elements to determine whether any content variation event related to the target webpage element occurs; when the content variation event occurs, storing previous data of the target webpage element and generating a first password, wherein the first password is a one-time password (OTP); trying extracting a second password from the target webpage element, for performing password verification, wherein in a situation where the target webpage element has not been modified, the second password is expected to be equal to the first password; and when failure of extracting the second password occurs or the first password and the second password are different from each other, recovering the target webpage element according to the previous data.

An advantage provided by the present invention is that, when the browser loads the aforementioned at least one webpage from the server (e.g. a webpage server) according to the uniform resource locator (URL) entered by the user, in addition to displaying the aforementioned at least one webpage, the browser is also capable of utilizing the program module of the aforementioned at least one webpage in order to perform related webpage content self-protection. More particularly, the webpage content self-protection method and associated electronic device of the present invention can perform the webpage content self-protection successfully in the electronic device without the aid of the webpage server.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
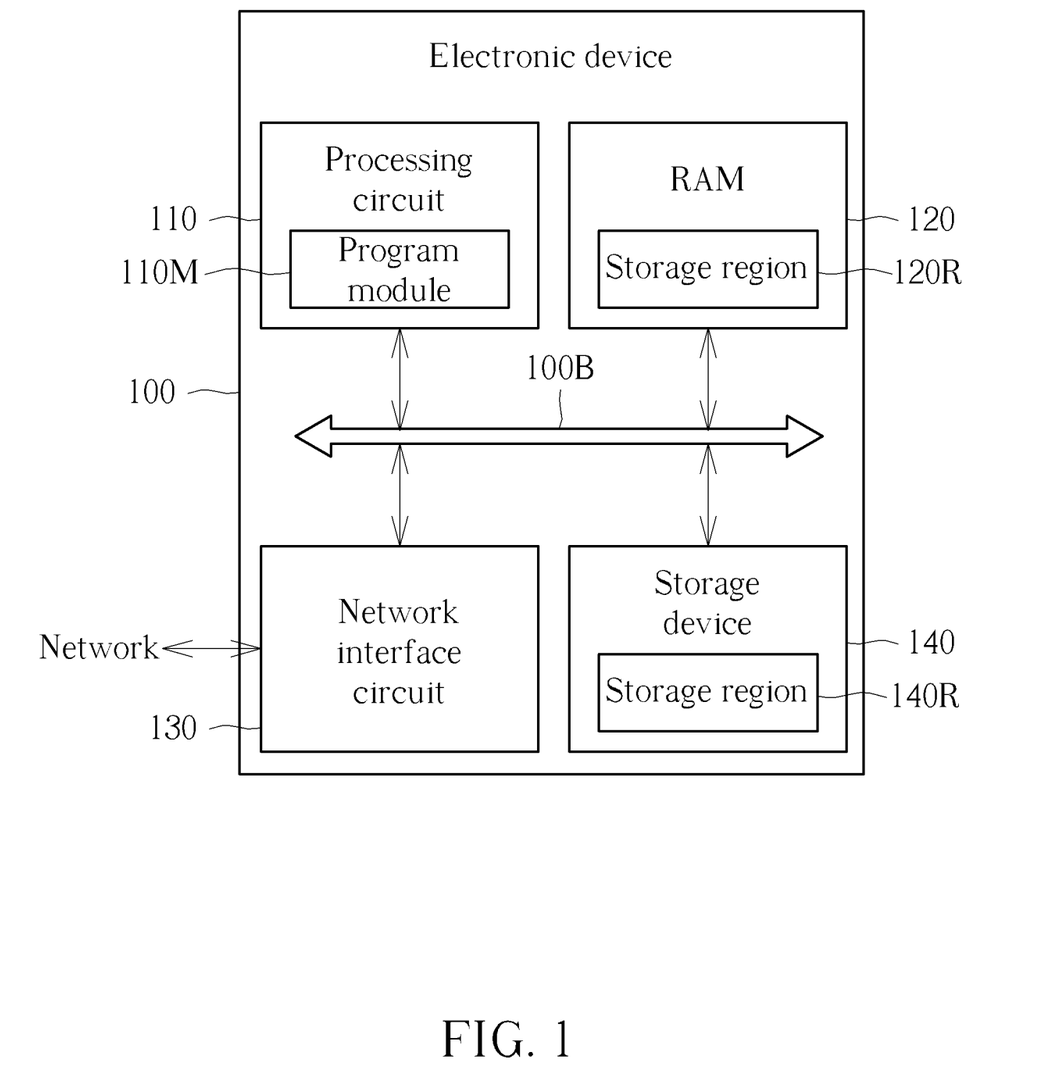
FIG. 1 is a diagram illustrating an electronic device according to an embodiment of the present invention.

FIG. 1 is a diagram illustrating an electronic device 100 according to an embodiment of the present invention. The electronic device 100 may comprise a processing circuit 110, a random access memory (RAM) 120, a network interface circuit 130 and a storage device 140, wherein these components may be coupled to each other via the bus 100B. In some embodiments, the architecture shown in FIG. 1 may vary, and one or more components may be added, removed or modified. In the aforementioned embodiment, the electronic device 100 may be implemented with a multifunctional mobile phone, a tablet, a desktop computer, a laptop computer, etc. The processing circuit 110 may be implemented with one or more processors. The storage device 140 may be implemented with a hard disk drive (HDD) or a non-volatile memory module, for example, a flash memory such as a flash memory module, a solid state drive (SSD), etc.

According to this embodiment, the processing circuit 110 may be arranged to execute at least one program module (e.g. one or more program modules), which may be collectively referred to as the program module 110M. Examples of the program module 110M may include, but are not limited to: an operating system (OS), a browser, and webpage program codes running through the browser. The processing circuit 110 may execute the program module 110M to control the operations of the electronic device 100. Further, the RAM 120 and the storage device 140 (e.g. the respective storage regions 120R and 140R thereof) may be arranged to store information, and the network interface circuit 130 may be arranged to link the electronic device 100 to at least one network (e.g. one or more networks, such as wired networks and/or wireless networks) in order to provide network services to the electronic device 100. For example, when the browser loads the webpage program codes from a webpage server according to the URL entered by the user, the webpage program codes may carry a webpage content self-protection program module which is implemented according to a webpage content self-protection method of the present invention. In addition to performing the webpage display, the browser can utilize the webpage content self-protection program module to perform the webpage content self-protection thereof.

Figure 2:
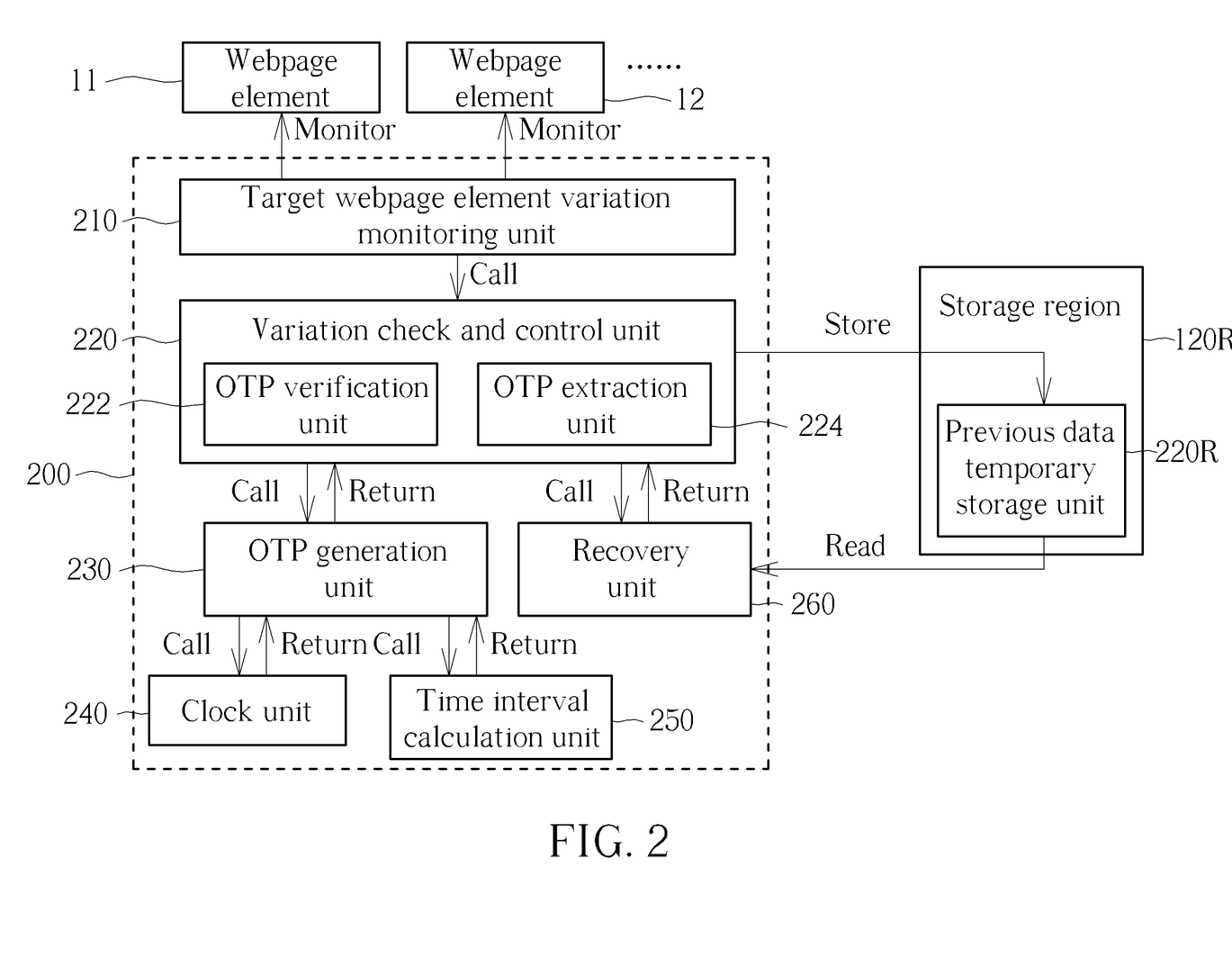
FIG. 2 is a diagram illustrating a control scheme of a webpage content self-protection method according to an embodiment according to the present invention.

FIG. 2 is a diagram illustrating a control scheme of the aforementioned webpage content self-protection method according to an embodiment according to the present invention, wherein the program module 200 may be taken as an example of the webpage content self-protection program module. The webpage program codes may comprise a set of webpage elements {11, 12, . . . } and the program module 200 of at least one webpage, and may run on the electronic device 100 (e.g. the processing circuit 110) through the browser. For example, the webpage elements may be composed by Document Object Model (DOM). The program module 200 may comprise a target webpage element variation monitoring unit 210, a variation check and control unit 220, a one-time password (OTP) verification unit 222, an OTP extraction unit 224, an OTP generation unit 230, a clock unit 240, a time interval calculation unit 250 and a recovery unit 260, and may write or read information in the previous data temporary storage unit 220R, wherein the previous data temporary storage unit 220R may be positioned in the storage region 120R. In some embodiments, the previous data temporary storage unit 220R may be positioned in the storage region 140R instead.

According to this embodiment, the target webpage element variation monitoring unit 210 may monitor one or more webpage elements in the set of webpage elements {11, 12, . . . }, and more particularly, monitor a target webpage element (e.g. any webpage element within the set of webpage elements {11, 12, . . . }). Further, when detecting any variation of the target webpage element, the target webpage element variation monitoring unit 210 may call the variation check and control unit 220, and provide or transmit previous data (e.g. pre-variation data such as the data before the variation) and latest data (e.g. post-variation data such as the data after the variation) of the target webpage element to the variation check and control unit 220. The variation check and control unit 220 may store the previous data into the previous data temporary storage unit 220R, for the recovery unit 260 to read whenever there is a need, wherein the recovery unit 260 may replace the latest data with the previous data to recover the target webpage element. Further, the variation check and control unit 220 may perform check and control associated with the variation, for example, perform the OTP verification and the OTP extraction by utilizing the OTP verification unit 222 and the OTP extraction unit 224, respectively. The variation check and control unit 220 may call the OTP generation unit 230 in order to obtain the OTP generated and returned by the OTP generation unit 230. For generating the OTP, the OTP generation unit 230 may call clock unit 240 and the time interval calculation unit 250, in order to obtain a current time value (e.g. the UNIX time used by the UNIX or UNIX-like system, such as the total seconds counted by the Coordinated Universal Time (UTC), starting from 00:00:00, Jan. 1, 1970, to the moment when calling the clock unit 240) returned by the clock unit 240 and a time interval returned by the time interval calculation unit 250. The OTP generation unit 230 may subtract an initial time value from the current time value to generate a time difference value, and then adopt an integer division method, more specifically, dividing the time difference value by a time interval through integer division to generate an integer division calculation result, and generate the OTP according to the integer division calculation result. For example, the OTP generation unit 230 may apply a predetermined function to the integer division calculation result (for example, by substituting the integer division calculation result into the predetermined function or associated equation thereof), in order to generate the OTP. In another example, based on a time-based one-time password (TOTP) algorithm, the OTP generation unit 230 may generate the OTP according to the integer division calculation result. In addition, the time interval may be equal to a predetermined value (e.g. 30 seconds or any other length of time or duration). In some embodiments, the program module 200 (e.g. the variation check and control unit 220, the OTP generation unit 230, and/or the time interval calculation unit 250) may adjust the time interval whenever there is a need.

For better understanding, assume that the variation is caused by another program module carried by the webpage program codes, and the other program module and the program module 200 may be provided by the webpage provider (or associated personnel thereof) of the aforementioned at least one webpage. In this situation, the other program module may generate an identical OTP (such as that which is exactly the same as the OTP mentioned above) based on the same OTP generation method in advance, and embed the identical OTP in the target webpage element, for the OTP extraction unit 224 to extract and for the OTP verification unit 222 to verify. Since the password verification is successful, the variation check and control unit 220 may allow the variation (e.g. modification of the target webpage element) and clear the previous data in the previous data temporary storage unit 220R. Assume that the variation is caused by malware (e.g. one or more bad-intention programs). In this situation, the correct password previously embedded in the target webpage element (e.g. the identical OTP) may become incorrect information or be lost. For example, when the correct password becomes the incorrect information, the OTP verification unit 222 may perform OTP verification according to the incorrect information extracted by the OTP extraction unit 224, but in this way the verification inevitably fails. In another example, when the correct password is lost, the OTP extraction unit 224 may perform OTP extraction, but the extraction inevitably fails. No matter whether the verification failure or the extraction failure occurs, the variation check and control unit 220 may call the recovery unit 260 to replace the latest data with the previous data, in order to recover the target webpage element, wherein the recovery unit 260 may return the operation result thereof, and more particularly, return completion information to the variation check and control unit 220 when the recovery operation is completed, in order to inform that the recovery operation has been completed.

Based on the control scheme shown in FIG. 2, the browser running on the electronic device 100 may load the aforementioned at least one webpage from the webpage server through the aforementioned at least one network to display the aforementioned at least one webpage and utilize the program module 200 thereof to perform the webpage content self-protection thereof. The webpage content self-protection can be performed entirely in the electronic device 100, without the need of the aid of the webpage server. Hence, the webpage content self-protection method of the present invention can guarantee excellent performance and high security.

Figure 3:
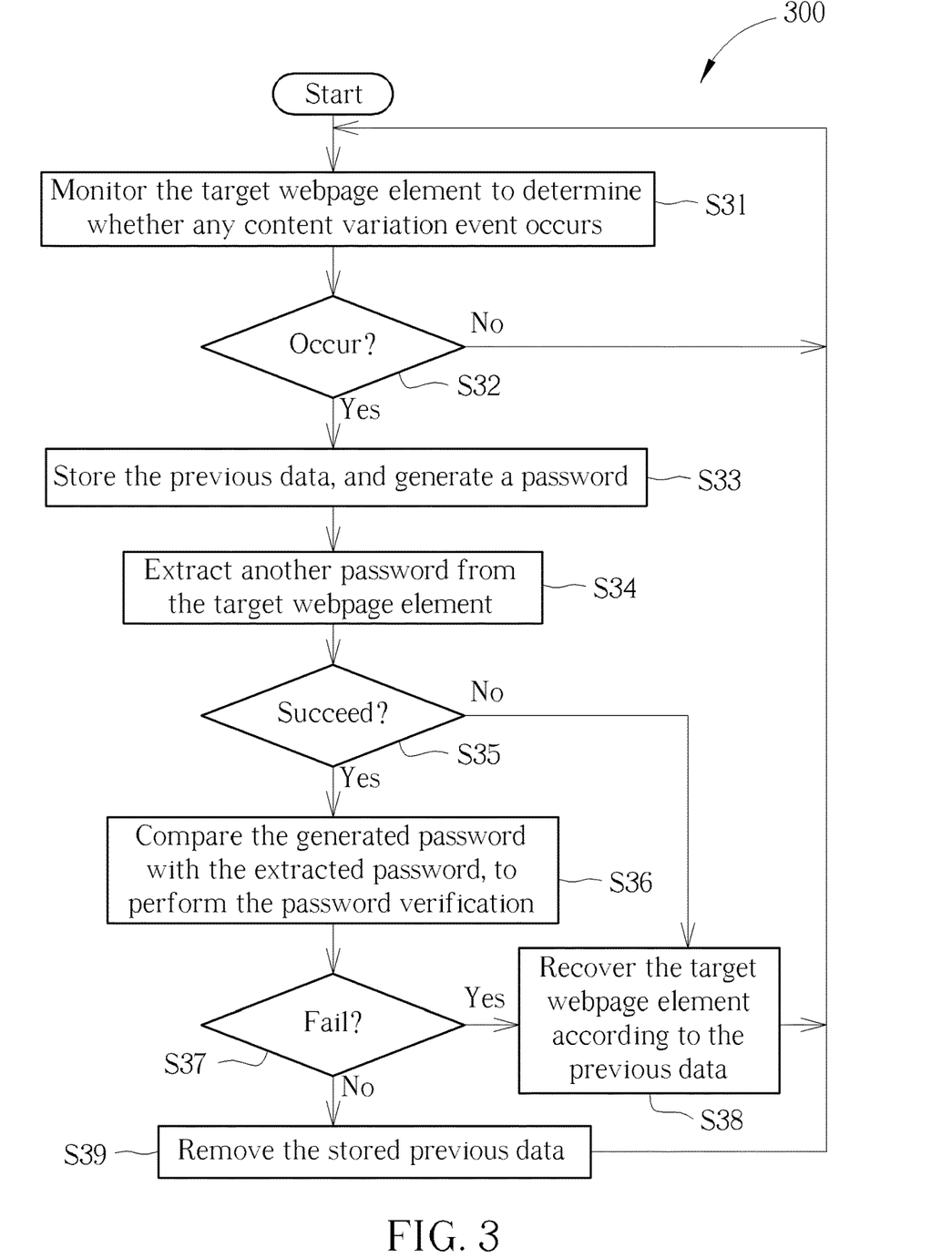
FIG. 3 illustrates a working flow of the webpage content self-protection method according to an embodiment according to the present invention.

FIG. 3 illustrates a working flow 300 of the webpage content self-protection method according to an embodiment according to the present invention. According to this embodiment, the processing circuit 110 may run the set of webpage elements {11, 12, . . . } of the aforementioned at least one webpage through the browser, and may run the program module 200 through the browser to perform operations associated with the webpage content self-protection, such as the operations in the working flow 300, wherein at least one portion of webpage elements within the set of webpage elements {11, 12, . . . } (e.g. a portion or all of the set of webpage elements {11, 12, . . . }) may comprise the webpage contents of the aforementioned at least one webpage. The working flow 300 may be described as follows.

In Step S31, the target webpage element variation monitoring unit 210 may monitor the target webpage element within the set of webpage elements {11, 12, . . . } to determine whether any content variation event (e.g. the event of the variation) related to the target webpage element occurs.

In Step S32, the target webpage element variation monitoring unit 210 may check whether the content variation event occurs. If the content variation event occurs, Step S33 is entered; otherwise, Step S31 is entered to continue monitoring the target webpage element.

In Step S33, the variation check and control unit 220 may store the previous data of the target webpage element, and may generate a first password (e.g. the OTP) by utilizing the OTP generation unit 230. For example, the variation check and control unit 220 may temporarily store the previous data in the previous data temporary storage unit 220R, and call the OTP generation unit 230 to generate the first password.

In Step S34, the variation check and control unit 220 may try extracting a second password from the target webpage element by utilizing the OTP extraction unit 224, for performing password verification. For example, in a situation where the target webpage element has not been modified, the second password (e.g. the identical OTP) is expected to be equal to the first password.

In Step S35, the variation check and control unit 220 may check whether the operation of extracting the second password is successful or not. When the operation of extracting the second password is successful (e.g. the OTP extraction unit 224 obtains the second password), Step S36 is entered; otherwise (e.g. the OTP extraction unit 224 generates an error message indicating that the extraction of the second password fails), Step S38 is entered.

In Step S36, the variation check and control unit 220 may compare the generated password (e.g. the first password mentioned in Step S33) with the extracted password (e.g. the second password mentioned in Step S34) by utilizing the OTP verification unit 222, to perform the password verification. According to this embodiment, the OTP verification unit 222 may compare the first password with the second password to generate a comparison result, which may indicate whether the first password and the second password are identical to each other or not. For example, the other program module carried by the webpage program codes may control, in advance, the target webpage element to carry the second password (e.g. the identical OTP), for performing password verification. In this situation, the comparison result may indicate that the first password and the second password are identical to each other.

In Step S37, the variation check and control unit 220 may check whether the password verification fails or not. When the password verification fails (e.g. the comparison result indicates that the first password and the second password are different from each other), Step S38 is entered; otherwise (e.g. the comparison result indicates that the first password and the second password are identical to each other), Step S39 is entered.

In Step S38, the variation check and control unit 220 may recover the target webpage element according to the previous data by utilizing the recovery unit 260. According to this embodiment, when failure of extracting the second password occurs, or the first password and the second password are different from each other, the recovery unit 260 may recover the target webpage element according to the previous data, and more particularly, may replace the latest data (e.g. the post-variation data such as the data after the variation) with the previous data (e.g. the pre-variation data such as the data before the variation).

In Step S39, the variation check and control unit 220 may remove the previous data stored in Step S33. For example, the variation check and control unit 220 may remove the previous data from the previous data temporary storage unit 220R.

For better comprehension, the method may be illustrated by the working flow 300 shown in FIG. 3. According to some embodiments, one or more steps may be added, deleted or modified in the working flow 300.

According to this embodiment, when loading the set of webpage elements {11, 12, . . . }, the browser may also load the program module 200 embedded in the aforementioned at least one webpage, in order to perform the working flow 300 (e.g. one or more associated steps within Steps {S31, S32, . . . , S39}, such as that corresponding to various situations). For example, when the variation is caused by the other program module, the steps corresponding to this situation (e.g. Steps {S31, S32, S33, S34, S35, S36, S37, S39}) may be performed sequentially. In another example, when the variation is caused by the malware, the steps corresponding to this situation (e.g. Steps {S31, S32, S33, S34, S35, S38} or Steps {S31, S32, S33, S34, S35, S36, S37, S38}) may be performed sequentially. Further, the set of webpage elements {11, 12, . . . } may conform to the document object model (DOM) specification.

Some implementation details regarding the target webpage element variation monitoring unit 210 are further described as follows. According to some embodiments, the program module 200 may call the browser through a predetermined application programming interface (API), in order to create an instance of an observer/listener, and may temporarily store the instance into the RAM 120 and return a reference of the instance. As a result, the program module 200 may perform some operations such as some settings on the instance through the reference, in order to monitor the target webpage element. For better understanding, the predetermined API may be a Mutation Observer API. For example, the program module 200 may perform associated control through executing the following program code:
var obs=new MutationObserver( );
obs.observe(target, config);
wherein MutationObserver( ) may create the instance and return the reference thereof, "target" within obs.observe (target, config) may represent the reference of the node to be observed (e.g. the target webpage element), and "observe (target, config)" within obs.observe(target, config) may be arranged to inform the instance of the type of the variation of this node to be observed (e.g. the target webpage element), such as increase or remove. For example, as long as the implementation of the present invention will not be hindered, the predetermined API may be any of other APIs. In some embodiments, the target webpage element variation monitoring unit 210 may operate the instance of the observer to monitor the target webpage element. In some embodiments, the program module 200 may utilize the instance of the observer as the target webpage element variation monitoring unit 210 to monitor the target webpage element.

According to some embodiments, the target webpage element may carry the second password through attributes. For example, the program code '<img tag="apple"/>' that is associated to the attributes may carry data with a tag being "apple", and the target webpage element may carry the second password in a similar way.

According to some embodiments, the target webpage element may carry the second password as shown in the following:

Changes.addedNodes = [{
    Node: <div name="sample" data-pwd="235300" />,
}]

where "235300" may be taken as an example of the second password (e.g. the identical OTP).

TABLE 1

| Previous data | Latest data |
|---|---|
| Null | Changes.addedNodes = [{<br>    Node: <div name="sample" data-pwd="002353" />,<br>}] |

Table 1 illustrates examples of the previous data (e.g. the pre-variation data such as the data before the variation) and the latest data (e.g. the post-variation data such as the data after the variation). Assume that the variation is caused by the malware, and the OTP extraction unit 224 may extract the second password (e.g. 002353). In Step S36, the variation check and control unit 220 may compare the first password (e.g. 235300) with the second password (e.g. 002353) by utilizing the OTP verification unit 222, in order to perform the password verification. Since the comparison result may indicate that the first password (e.g. 235300) and the second password (e.g. 002353) are different from each other, the password verification fails. In Step S38, the variation check and control unit 220 may recover the target webpage element according to the previous data (e.g. Null) by utilizing the recovery unit 260.

Figure 4:
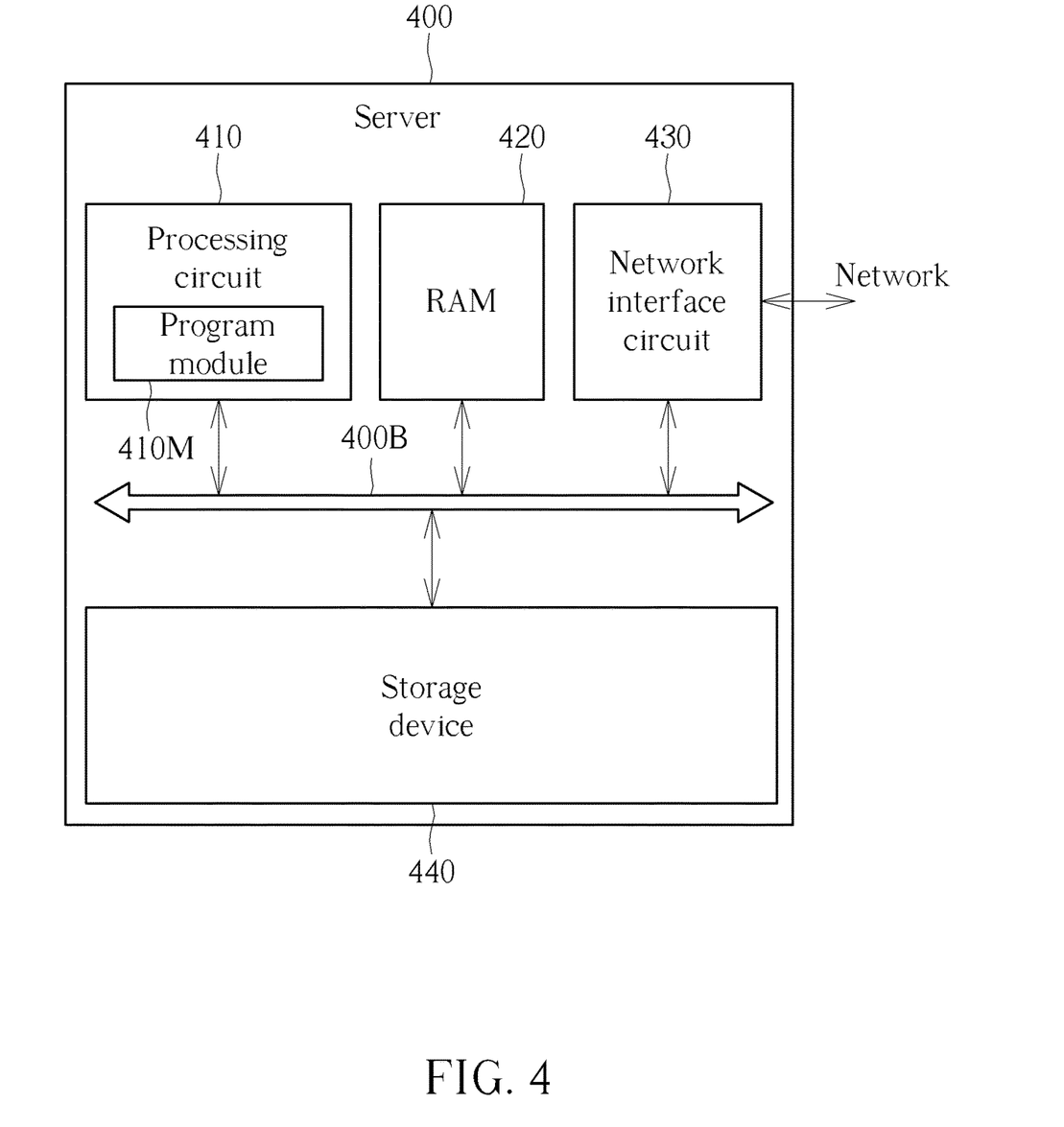
FIG. 4 is a diagram illustrating a server according to an embodiment of the present invention.

FIG. 4 is a diagram illustrating a server 400 according to an embodiment of the present invention. The server 400 may comprise a processing circuit 410, a RAM 420, a network interface circuit 430 and a storage device 440, wherein these components may be coupled to each other via the bus 400B. In some embodiments, the architecture shown in FIG. 4 may vary, and one or more components may be added, deleted or modified. In the aforementioned embodiment, the processing circuit 410 may be implemented with one or more processors, and the storage device 440 may be implemented with an HDD or an SSD.

According to this embodiment, the processing circuit 410 may execute the program module 410M to control the operations of the control server 400, and the program module 410M may comprise an OS, a database management program, a webpage management program, etc. Further, the RAM 420 and the storage device 440 may be arranged to store information, and the network interface circuit 430 may be arranged to couple the server 400 to the aforementioned at least one network. For example, the webpage program codes may be stored in the storage device 440 or in another server in advance. The processing circuit 410 may read the webpage program codes that are stored in advance and may temporarily store the webpage program codes into the RAM 420, in order to provide the webpage services to any client device of multiple client devices, such as the electronic device 100. The processing circuit 410 may utilize the network interface circuit 430 to transmit the webpage program codes carrying the aforementioned webpage contents through the aforementioned at least one network from the server 400 to the browser of the client device, for performing webpage content self-protection while displaying the webpage contents, wherein the aforementioned webpage content self-protection may comprise: running the set of webpage elements {11, 12, . . . } of the aforementioned at least one webpage through the browser; and running the program module 200 of the aforementioned at least one webpage through the browser to perform operations associated to webpage content self-protection, such as the operations in the working flow 300.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A webpage content self-protection method, comprising:
running a set of webpage elements of at least one webpage through a browser, wherein at least one portion of webpage elements within the set of webpage elements comprises webpage contents of said at least one webpage; and
running a program module of said at least one web page through the browser to perform the following steps:
monitoring a target webpage element within the set of webpage elements to determine whether any content variation event related to the target webpage element occurs;
in response to occurrence of the content variation event, storing previous data of the target webpage element and generating a first password, wherein the first password is a one-time password (OTP) generated according to a time parameter of the target webpage element;
extracting a second password from the target webpage element, for performing password verification; and
when the second password cannot be extracted, or when the first password and the second password are different from each other, recovering the target webpage element according to the previous data;
wherein when the content variation is allowed, the second password will be identical to the first password.

2. The webpage content self-protection method of claim 1, wherein in addition to the set of webpage elements, the browser also loads the program module embedded in said at least one webpage, for performing the step of monitoring the target webpage element, the step of storing the previous data of the target webpage element and generating the first password, the step of extracting the second password from the target webpage element, and the step of recovering the target webpage element.

3. The webpage content self-protection method of claim 1, further comprising:
utilizing a target webpage element variation monitoring unit to monitor the target webpage element;
wherein when the content variation event occurs, the target webpage element variation monitoring unit provides the previous data of the target webpage element.

4. The webpage content self-protection method of claim 1, further comprising:
controlling, in advance, the target webpage element to carry the second password, for performing password verification.

5. The webpage content self-protection method of claim 1, wherein generating the first password according to the time parameter of the target webpage element comprises:
subtracting an initial time value from a current time value to generate a time difference value;
dividing the time difference value by a time interval through integer division to generate an integer division calculation result; and
generating the first password according to the integer division calculation result.

6. The webpage content self-protection method of claim 5, further comprising:
applying a predetermined function to the integer division calculation result, in order to generate the first password.

7. The webpage content self-protection method of claim 5, further comprising:
based on a time-based one-time password (TOTP) algorithm, generating the first password according to the integer division calculation result.

8. The webpage content self-protection method of claim 1, wherein storing the previous data of the target webpage element comprises:
storing the previous data into a previous data temporary storage unit, for follow-up reading.

9. The webpage content self-protection method of claim 8, wherein the previous data temporary storage unit is arranged in a storage region of a random access memory (RAM) of the client device.

10. A server, comprising:
a network interface circuit, arranged to couple the server to at least one network; and
a processing circuit, coupled to the network interface circuit, the processing circuit arranged to control operations of the server, wherein the processing circuit utilizes the network interface circuit to transmit webpage program codes carrying webpage contents from the server to a browser in a client device through said at least one network, for performing webpage content self-protection while displaying the webpage contents, wherein the webpage program codes comprise a set of webpage elements and a program module of at least one webpage;
wherein the webpage content self-protection comprises:
running the set of webpage elements of said at least one webpage through the browser, wherein at least one portion of webpage elements within the set of webpage elements comprises the webpage contents of said at least one webpage; and
running the program module of said at least one webpage through the browser to perform the following steps:
monitoring a target webpage element within the set of webpage elements to determine whether any content variation event related to the target webpage element occurs;
when the content variation event occurs, storing previous data of the target webpage element and generating a first password, wherein the first password is a one-time password (OTP) generated according to a time parameter of the target webpage element;

extracting a second password from the target webpage element, for performing password verification; and when the second password cannot be extracted, or the first password and the second password are different from each other, recovering the target webpage element according to the previous data;

wherein when the content variation is allowed, the second password will be identical to the first password.

11. A client device, comprising:

a network interface circuit, arranged to couple the client device to at least one network; and a processing circuit, coupled to the network interface circuit, the processing circuit arranged to control operations of the client device, wherein the processing circuit utilizes the network interface circuit to receive webpage program codes carrying webpage contents from the server through said at least one network, for performing webpage content self-protection while displaying the webpage contents, wherein the webpage program codes comprise a set of webpage elements and a program module of at least one webpage;

wherein the webpage content self-protection comprises:

running the set of webpage elements of said at least one webpage through a browser, wherein at least one portion of webpage elements within the set of webpage elements comprises the webpage contents of said at least one webpage; and running the program module of said at least one webpage through the browser to perform the following steps:

monitoring a target webpage element within the set of webpage elements to determine whether any content variation event related to the target webpage element occurs;

when the content variation event occurs, storing previous data of the target webpage element and generating a first password, wherein the first password is a one-time password (OTP) generated according to a time parameter of the target webpage element;

extracting a second password from the target webpage element, for performing password verification; and when failure of extracting the second password cannot be extracted or the first password and the second password are different from each other, recovering the target webpage element according to the previous data;

wherein when the content variation is allowed, the second password will be identical to the first password.

12. The client device of claim 11, wherein in addition to the set of webpage elements, the browser also loads the program module embedded in said at least one webpage, for performing: the step of monitoring the target webpage element, the step of storing the previous data of the target webpage element and generating the first password, the step of extracting the second password from the target webpage element, and the step of recovering the target webpage element.

13. The client device of claim 11, wherein said webpage content self-protection further comprises:

utilizing a target webpage element variation monitoring unit to monitor the target webpage element;

wherein when the content variation event occurs, the target webpage element variation monitoring unit provides the previous data of the target webpage element.

14. The client device of claim 11, wherein said webpage content self-protection further comprises:

controlling, in advance, the target webpage element to carry the second password, for performing password verification.

15. The client device of claim 11, wherein generating the first password according to the time parameter of the target webpage element comprises:

subtracting an initial time value from a current time value to generate a time difference value;

dividing the time difference value by a time interval through integer division to generate an integer division calculation result; and generating the first password according to the integer division calculation result.

16. The client device of claim 15, wherein said webpage content self-protection further comprises:

applying a predetermined function to the integer division calculation result, in order to generate the first password.

17. The client device of claim 15, wherein said webpage content self-protection further comprises:

based on a time-based one-time password (TOTP) algorithm, generating the first password according to the integer division calculation result.

18. The client device of claim 11, wherein storing the previous data of the target webpage element comprises:

storing the previous data into a previous data temporary storage unit, for follow-up reading.

19. The client device of claim 18, wherein the previous data temporary storage unit is arranged in a storage region of a random access memory (RAM) of the client device.

20. The client device of claim 18, wherein the previous data temporary storage unit is arranged in a storage region of a storage device of the client device.

* * * * *